United States Patent [19]

Becker et al.

[11] 4,325,731
[45] Apr. 20, 1982

[54] PROCESS OF PRODUCING REDUCING GAS FROM SOLID FUELS

[75] Inventors: Paul Becker, Eschborn; Heinz Jockel, Büttelborn; Paul Rudolph, Bad Homburg; Manfred Kühn, Frankfurt am Main, all of Fed. Rep. of Germany

[73] Assignee: Metallgesellschaft Aktiengesellschaft, Frankfurt, Fed. Rep. of Germany

[21] Appl. No.: 132,576

[22] Filed: Mar. 21, 1980

[30] Foreign Application Priority Data

Mar. 24, 1979 [DE] Fed. Rep. of Germany ....... 2911692

[51] Int. Cl.³ .............................................. C21B 13/00
[52] U.S. Cl. .......................................... 75/91; 75/35
[58] Field of Search ............... 75/91, 34, 35; 266/140, 266/156

[56] References Cited

U.S. PATENT DOCUMENTS 3,935,002 1/1976 Miyashita et al. ...................... 75/42
4,246,024 1/1981 Price-Falcon et al. .................. 75/35

Primary Examiner—M. J. Andrews
Attorney, Agent, or Firm—Sprung, Felfe, Horn, Lynch & Kramer

[57] ABSTRACT

A process for reducing an ore which comprises:
(A) gasifying a solid carbonaceous granular fuel by contacting the same in a fixed bed with oxygen and steam at a pressure of 5 to 50 bars;
(B) subjecting the gas produced from said gasification to shift conversion in order to reduce the residual carbon monoxide content to 1 to 10 percent by volume of dry gas
(C) scrubbing the gaseous shift conversion gas to remove sulfur compounds and to reduce the $CO_2$ content to no more than 3 percent by volume whereby to provide a scrubbed gas containing more than 70 percent by volume hydrogen and carbon monoxide which gas contains more than 10 percent by volume methane
(D) admixing the so scrubbed gas with reduction process exhaust gas formed by reduction of ore
(E) reforming the resultant mixture of gases at a pressure of 1.5–10 bars a temperature of 800° to 1500° C.; and
(F) feeding at least a portion of such gas containing up to 3 percent by volume $CO_2$ and 5 percent by volume methane at 700°–1000° to an ore-reducing plant and therein contacting said ore therewith.

4 Claims, 1 Drawing Figure

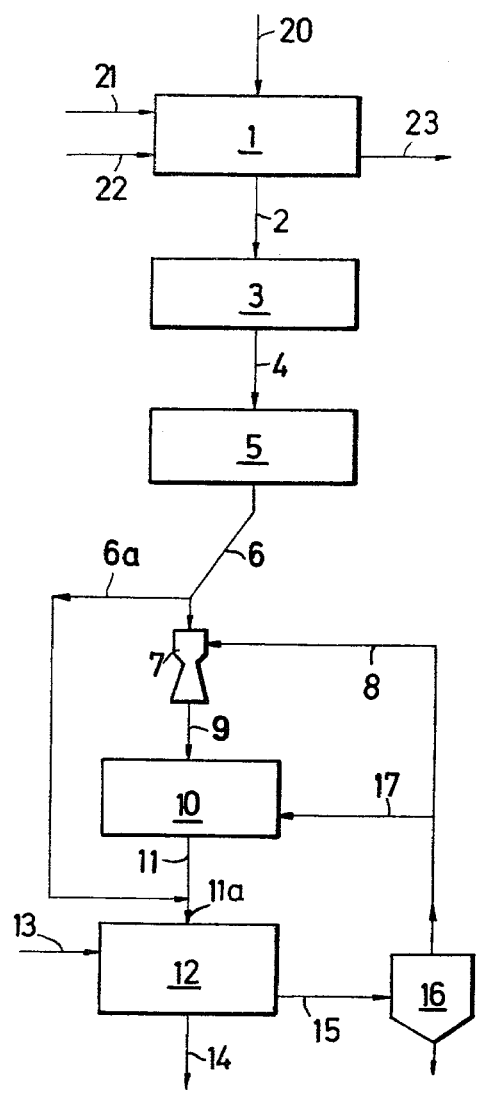

PROCESS OF PRODUCING REDUCING GAS FROM SOLID FUELS

This invention relates to a process in which a reducing gas which consists in at least 80% by volume of the components hydrogen and caron monoxide and is intended for use in the reduction of ores is produced by the gasification of solid granular fuels in a fixed bed by a treatment with oxygen and steam under a pressure in the range of 5 to 50 bars.

The production and use of reducing gas for the reduction of ores is known from "gwf-Gas/Erdgas", the periodical of the Deutsche Verein des Gas und Wasserfaches, October 1976, pages 412 to 423. The reducing gas is preferably produced from gaseous or liquid hydrocarbons. Another starting material is powderized dust, which is gasified.

It is an object of the invention to provide a process for the production of reducing gas by the proved technology of the gasification of solid granular fuels in a fixed bed by a treatment with oxygen and steam.

SUMMARY OF THE INVENTION

The foregoing is accomplished, according to the invention, in that the gas produced by the gasification is subjected to shift conversion in order to reduce its residual carbon monoxide content to about 1 to 10% by volume of dry gas, the shift-converted gas is scrubbed to remove the sulfur compounds and to reduce its $CO_2$ content to 3% by volume, at most, and to provide a scrubbed gas which contains more than 70% by volume of hydrogen and carbon monoxide and contains more than 6% by volume of methane, the scrubbed gas is mixed with a reduction process exhaust gas formed by the reduction of ores, the mixed gases are reformed under a pressure of 1.5 to 10 bars and at temperatures of 800° to 1500° C., and an at least partly reformed gas, which contains up to 3% by volume of $CO_2$ and up to 5% by volume of methane and is at temperatures of about 700° to 1000° C., is fed to an ore-reducing plant as reducing gas, said exhaust gas is withdrawn from said plant. In that process, the $CO_2$ of the gas produced by the gasification of fuel is shift-converted to such a degree that it is not necessary to remove $CO_2$ from the reduction process exhaust gas formed by the reduction of ores.

The gas coming from the scrubber is suitably under a pressure of at least 5 bars and is used in an ejector to entrain the exhaust gas to be admixed. In this way the pressure of the exhaust gas can be increased, without an additional expenditure for compressing, to the value required for its use in the reforming stage.

40 to 80% of the scrubbed gas are preferably mixed with reduction process exhaust gas before the reforming. The remainder of the scrubbed gas is added to the reformed gas to adjust the methane content of the reducing gas to about 2 to 4% by volume.

In the reforming stage, carbon monoxide and hydrogen are produced from methane and other hydrocarbons by endothermic reactions with $H_2O$ and $CO_2$. At least part of the heat requirement of the reforming stage is supplied by combusting a fuel gas which is a part of the reduction process exhaust gas. 15 to 30% of the entire reduction process exhaust gas are usually employed as that fuel gas.

BRIEF DESCRIPTION OF DRAWING

Referring to the annexed drawing, the same is a flow diagram of a process according to the invention.

DESCRIPTION OF SPECIFIC EMBODIMENT

One possible sequence of the steps required for the process according to the invention is shown on the drawing.

The product gas from the gasifier 1 is supplied through duct 2 to a CO shift-converter 3. The shift-converted gas has a residual CO content of about 1 to 10% by volume of dry gas and is fed through duct 4 to the scrubber 5, in which the sulfur compounds and a major part of the $CO_2$ are removed from the gas, as well as hydrocarbons of the naphtha range.

The scrubber 5 and the shift converter 3 are operated under superathmospheric pressure so that the scrubbed gas in duct 6 is under a pressure of at least 5 bars. Part of the scrubbed gas flowing in duct 6, usually 20 to 60% of said gas, is branched off in duct 6a. The remaining gas is used in an ejector 7 to entrain and to be mixed with reduction process exhaust gas from duct 8. The mixed gases are fed in duct 9 to a reforming stage 10.

Methane and higher gaseous hydrocarbons are dissociated in the reforming stage 10 by a treatment with $CO_2$ and $H_2O$ to form the reducing gas components CO and $H_2$. Gas from duct 6a is admixed to the reformed gas in duct 11 to form the reducing gas.

The reduction gas product is then fed in duct 11a to the reducing plant 12, which is fed at 13 with ore, especially iron ore, particularly in the form of pellets. Reduced material, such as sponge iron, is withdrawn at 14.

The reduction of the ore by means of a reducing gas results in an exhaust gas, which is described here as a reduction process exhaust gas. That reduction process exhaust gas still has considerable contents of unreacted carbon monoxide and hydrogen so that it has a usable calorific value. The reduction process exhaust gas is first fed in duct 15 to a scrubber 16, in which solids are removed from the reduction process exhaust gas and the latter is cooled at the same time. Part of the reduction process exhaust gas which has been scrubbed is branched off in duct 17 and is used as a fuel gas in the reforming stage 10. The remaining reduction process exhaust gas flows in duct 8 to the ejector 7. All of the reduction process exhaust gas can be used as stated without a decrease of its $CO_2$ content by scrubbing and/or in another manner.

The gasifier 1 is fed through duct 20 with granular solid fuel, particularly coal or lignite. The particle size range of the coal or agglomerated coal is in the range of 2 to 70 mm. Oxygen supplied through duct 21 and stean and/or $CO_2$ supplied through duct 22 are used in the gasifier 1 as gasifying agents. Incombustible residue is withdrawn in conduit 23. In the gasifying step, known per se, the fuel constitutes a fixed bed, which is gradually subsiding. The gasifying agents are introduced into the lower portion of that fixed bed. That process is known from numerous publications and has been described, inter alia, in German Pat. Nos. 2,346,833 and 2,604,383 and the corresponding U.S. Pat. Nos. 3,937,620 and 4,033,730. Further details can be taken from U.S. Pat. No. 3,540,867 and German Pat. No. 2,353,241. Said publications describe the known Lurgi process. The disclosures of such patents are hereby incorporated herein by reference.

The gasification of fuel in a fixed bed may be carried out mainly in either of two ways. In a first way, the gasifying agents are intriduced into the gasification chamber from underneath through a rotary grate; in that case the ash remains solid. Alternatively, the gasifying agents may be supplied through nozzles and the incombustible residue may be withdrawn as liquid slag. The gasification involving a withdrawal of liquid slag is known from British Pat. Nos. 1,507,905; 1,508,671; and 1,512,677, whose disclosures are also incorporated herein by references.

Immediately behind the gasifying reactor the raw gas which has been produced by gasification and is to be supplied in duct 2 to the CO shift converter 3 is scrubbed by being sprayed with raw gas condensate and is cooled to temperatures of about 150° to 200° C. at the same time. That process is described in German Offenlegungsschrift No. 2,543,532 and corresponding U.S. Pat. No. 4,065,273. As a result of said scrubbing part of the tar content is removed from the gas to be supplied to be CO shift converter 3 and the gas is entirely or substantially saturated with water vapor. The gas has the following analysis in % by volume of dry gas:

| | |
|---|---|
| $CO_2$ | about 24 to 33 |
| CO | about 16 to 25 |
| $H_2$ | about 36 to 44 |
| $CH_4$ | about 8 to 13 |
| $C_2+$ | up to about 1 |
| $N_2 + A$ | up to about 2 |

In the CO shift converter 3, part of the $CO_2$ content of the gas is catalytically reacted with water vapor in known manner to form hydrogen and $CO_2$. One embodiment of a shift converter 3 is shown in German Offenlegungsschrift No. 2,709,768 (and corresponding U.S. Pat. No. 4,161,393). The gas withdrawn from shift converter 3 in duct 4 contains only about 1 to 10% CO by volume of dry gas.

The succeeding scrubber 5 may be used to carry out, e.g., the known Rectisol process, in which the gas is scrubbed under superatmospheric pressure with methanol at temperatures of about −20° to −60° C. That scrubbing process has also been fully described in the literature, e.g., in Ullmans Enzyklopädie der technischen Chemie, 4th edition (1977), volume 14, pages 432 to 435.

As the shift-converted gas is scrubbed in accordance with the Rectisol process, the sulfur compounds are removed from the gas and its $CO_2$ content is decreased to not more than 3% by volume.

Compression is required to permit scrubbed gas from duct 6 together with recycled reduction process exhaust gas from duct 8 to be fed to the reforming stage 10. A simple compression without need for a compressor can be effected in the ejector 7 although the latter may obviously be replaced by a compressor.

The reforming stage 10 may comprise the known cracking tubular heater, which contains heated nickel catalyst in its tubes. Such reforming stage has been explained on pages 413 and 414 of the above-mentioned periodical "gwf-Gas/Erdgas". Alternatively, the reforming stage may comprise a gas converter such as is described on pages 419 and 420 of "gwf-Gas/Erdgas" and in German Pat. No. 1,201,377 and corresponding U.S. Pat. No. 3,189,438. In that process, two parallel gas converters are employed and at least one of them is operated as a reformer at a time while the other is heated. The reformer contains ceramic granules, which serve as heat accumulators and at temperatures of about 1400° C. cause methane and $CO_2$ to be converted to $2CO + 2H_2$. The gas withdrawn from a converter must be cooled before it can be used as a reducing gas. The gas from a cracking tubular heater generally need be cooled.

As to details of the reduction plant 12 and the scrubber 16, reference is made to the above-mentioned publication in "gwf-Gas/Erdgas" and to German Patent Publication 1,914,400 and corresponding U.S. Pat. No. 3,748,120.

EXAMPLE

A system as shown on the drawing is operated as follows to produce 1000 kg sponge iron.

The gasifier 1 is fed with 310 kg granular coal (calculated without water and ash), 650 kg steam and 117 standard m³ oxygen. The gasifier is operated according to the known Lurgi process, in which a rotary grate generator is used and the ash remains solid. The product gas from the generator is passed in known manner through a scrubber-cooler and is cooled therein before entering the duct 2.

The CO shift converter 3 comprises two stages in accordance with German Offenlegungsschrift No. 2,709,766 and contains a commercially available catalyst available from Topsoe, Type SSK. The reforming stage 10 comprises a plant as described on pages 413/414 of "gwf-Gas/Erdgas" mentioned above and contains a commercially available nickel catalyst. Reference is made to "gwf-Gas/Erdgas" and German Pat. No. 1,914,400 (FIGS. 1 to 3) as regards details of the reducing plant. 423 standard m³ of water vapor are withdrawn from the reduction process exhaust gas in the scrubber 16. Details regarding the conditions in the various ducts shown on the drawing are apparent from the following Table.

TABLE

| Duct | 2 | 4 | 6 | 8 | 9 | 11 | 11a | 15 |
|---|---|---|---|---|---|---|---|---|
| Pressure (bars) | 22 | 20 | 18 | about 1 | 2.5 | 1.5 | about 3 | about 1 |
| Temperature (°C.) | 172 | about 250 | 20 | 45 | 30 | 900 | 760 | 310 |
| Quantity of gas (standard m³) | 1324 | 1324 | 601 | 1064 | 1383 | 1496 | 1761 | 1761 |
| Gas components (% by volume) | | | | | | | | |
| $CH_4$ | 5.9 | 5.9 | 13.0 | 3.7 | 5.8 | 1.9 | 3.6 | 2.8 |
| $C_nH_m$ | 0.3 | 0.3 | 0.7 | — | 0.2 | — | 0.1 | — |
| CO | 12.8 | 0.8 | 1.7 | 13.0 | 10.4 | 20.8 | 17.8 | 9.8 |
| $CO_2$ | 15.9 | 27.9 | 1.5 | 11.9 | 9.5 | 1.5 | 1.5 | 9.0 |
| $H_2$ | 25.4 | 37.4 | 82.6 | 62.8 | 67.4 | 66.2 | 68.7 | 47.8 |
| Gas components (% by volume) | | | | | | | | |
| $H_2O$ | 39.4 | 27.4 | — | 3.9 | 3.0 | 6.3 | 5.3 | 27.0 |
| $N_2$ | 0.3 | 0.3 | 0.5 | 4.7 | 3.7 | 3.5 | 3.0 | 3.6 |

What is claimed is:

1. A process for reducing an ore which comprises:
(A) at a pressure of 5 to 50 bars gasifying a solid carbonaceous granular fuel by contacting the same in a fixed bed with oxygen and steam fed into the lower portion of said fixed bed;

(B) scrubbing the gas produced from said gasification and cooling it to temperature of about 150° to 200° C., said cooled gas containing hydrogen, carbon monoxides, methane, water vapor and tar, subjecting said gas to shift conversion in order to adjust the residual carbon monoxide content to 1 to 10 percent by volume of dry gas;

(C) scrubbing the gas from shift conversion to remove sulfur compounds and to reduce the $CO_2$ content to no more than 3 percent by volume whereby to provide a scrubbed gas containing more than 70 percent by volume hydrogen and carbon monoxide which gas contains more than 6 percent by volume methane;

(D) admixing at least part of the so-scrubbed gas with reduction process exhaust gas formed by reduction of ore;

(E) reforming the resultant mixture of gases at a pressure of 1.5–10 bars at a temperature of 800° to 1500° C. thereby producing a reformed gas predominantly containing hydrogen and carbon monoxide;

(F) feeding at least a portion of said reformed gas containing up to 3 percent by volume $CO_2$ and up to 5 percent by volume methane as a reducing gas at 700°–1000° C. to an ore-reducing plant, therein contacting said ore therewith and withdrawing exhaust gas from said plant and feeding at least part of said exhaust gas into step D.

2. A process according to claim 1 wherein 40 to 80 percent of the scrubbed gas from step C is mixed with reduction process exhaust gas before the reforming of step E and the remainder of the scrubbed gas is added to the reformed gas to adjust the methane content of the reducing gas to about 2–4 volume percent.

3. A process according to claim 1 wherein gas from the scrubber employed in step C is under a pressure of at least 5 bars and is used in an ejector to entrain reduction process exhaust gas which is to be mixed therewith.

4. A process according to claim 1 wherein 15–30 percent of the reduction process exhaust gas is used in the reforming stage as a fuel gas.

* * * * *